3,238,093
NEMATOCIDAL 1,1-DIHALOETHYLENES
Kenneth Wayne Ratts, Creve Coeur, Mo., assignor to Monsanto Company, a corporation of Delaware
No Drawing. Filed Feb. 15, 1963, Ser. No. 258,893
5 Claims. (Cl. 167—30)

This invention relates to a method of destroying nematode parasites employing as the essential active ingredient at least one 1,1-dihaloethylene of the formula

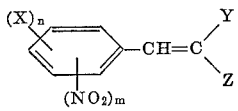

wherein X and Y are like or unlike halogens of atomic weight in the range of 35 to 80 (i.e. chlorine or bromine), wherein Z is halogen of atomic weight in the range of 18 to 80 (i.e. fluorine, chlorine or bromine), wherein $m$ is an integer from 0 to 2, wherein $n$ is an integer from 0 to 3, and wherein the sum of $m$ and $n$ is an integer from 0 to 3.

The 1,1-dihaloethylenes of this invention can be prepared by reacting a triphenylphosphinedihalomethylene of the formula

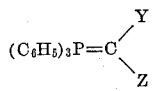

wherein Y and Z have the aforedescribed significance with a benzaldehyde or mixtures thereof of the formula

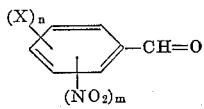

wherein X, $m$ and $n$ have the aforedescribed significance in an inert anhydrous organic liquid medium.

These triphenylphosphinedihalomethylene precursors are prepared by adding a haloform (i.e. chloroform, bromoform, fluorodichloromethane or bromodichloromethane) to a suspension of triphenylphosphine and potassium t-butoxide in an inert anhydrous organic liquid hydrocarbon medium at a temperature of about 0 to 10° C. It is preferred not to separate the resulting triphenylphosphinedihalomethylene (a yellow solid in all instances) because of its reactivity with water but to add the appropriate benzaldehyde or mixtures thereof to the resulting reaction mass or concentrate thereof and thereafter recover the resulting 1,1-dihaloethylene. As illustrative of the preparation of the nematocidally active 1,1-dihaloethylenes of this invention are the following:

Example I 12 parts by weight of chloroform in about 140 parts by weight of heptane is added over a 30 minute period to a well-agitated, ice-cooled mixture of 26.2 parts by weight of triphenylphosphine and 11.2 parts by weight of anhydrous potassium t-butoxide in about 210 parts by weight of heptane. The resulting yellow suspension of triphenylphosphinedichloromethylene, i.e.

$$(C_6H_5)_3P=CCl_2$$

is then concentrated to about 100 parts by volume by vacuum distilling at about 15–20° C. To this concentrate is added 15.1 parts by weight of 4-nitrobenzaldehyde in about 70 parts by weight of heptane. The reaction mass is then maintained at 20–25° C. while agitating for about 18 hours. The resulting mixture is filtered and the filter cake is washed twice with heptane (about 70 parts by weight each) and the washings combined with the original filtrate. The combined washings and filtrate are then subjected to vacuum distillation at 20–30° C. to remove the heptane. The residual yellow solid upon recrystallizing from methanol gave 17.9 parts by weight of yellow solid 1,1-dichloro-2-(4-nitrophenyl)ethylene. This material is also termed β,β-dichloro-p-nitrostyrene.

Example II

Employing the procedure of Example I but replacing 4-nitrobenzaldehyde with an equimolecular amount of benzaldehyde there is obtained 1,1-dichloro-2-(phenyl)ethylene which boils at 93° C. at 9 mm.

Example III

Employing the procedure of Example I but replacing chloroform with an equimolecular amount of bromoform there is obtained solid 1,1-dibromo-2-(4-nitrophenyl)ethylene. In this instance the intermediary phosphinedihalomethylene is yellow solid triphenylphosphinedibromomethylene, i.e. $(C_6H_5)_3P=CBr_2$.

Example IV

Employing the procedure of Example I but replacing chloroform with an equimolecular amount of bromodichloromethane there is obtained solid 1-chloro-1-bromo-2-(4-nitrophenyl)ethylene. In this instance the intermediary phosphinedihalomethylene is yellow solid triphenylphosphinechlorobromomethylene, i.e. $(C_6H_5)_3P=CBrCl$.

Example V 12 parts by weight of chloroform in about 140 parts by weight of heptane is added over a 30 minute period to a well-agitated, ice-cooled mixture of 26.2 parts by weight of triphenylphosphine and 11.2 parts by weight of anhydrous potassium t-butoxide in about 210 parts by weight of heptane. The resulting yellow suspension of triphenylphosphinedichloromethylene, i.e. $(C_6H_5)_3P=CCl_2$, is then concentrated to about 100 parts by volume by vacuum distilling at about 15–20° C. To this concentrate is added 17.6 parts by weight of 3,4-dichlorobenzaldehyde in about 70 parts by weight of heptane. The reaction mass is then heated at 90–100° C. for about 2 hours. The resulting mixture is cooled to about room temperature and filtered. The filter cake is washed twice with heptane (about 70 parts by weight each) and the washings combined with the original filtrate. The combined washings and filtrate are then subjected to vacuum distillation at 20–30° C. to remove the heptane. The residual oil is further distilled and the fraction collected at 116° C. at 1.1 mm. is oily 1,1-dichloro-2-(3,4-dichlorophenyl)ethylene.

Example VI

Employing the procedure of Example V but replacing 3,4-dichlorobenzaldehyde with an equimolecular amount of 2,6-dichlorobenzaldehyde there is obtained oily, 1,1-dichloro-2-(2,6-dichlorophenyl)ethylene at 110–112° C. at 5 mm.

In like manner the following nematocidally active 1,1-dihaloethylenes and mixtures thereof are prepared from the appropriate triphenylphosphinedihalomethylene and the appropriate benzaldehyde or mixtures thereof

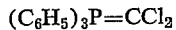

1,1-dibromo-2-(phenyl)ethylene
1-chloro-1-fluoro-2-(phenyl)ethylene
1,1-dichloro-2-(3-chlorophenyl)ethylene
1,1-dichloro-2-(4-chlorophenyl)ethylene
1,1-dichloro-2-(2,4-dichlorophenyl)ethylene
1,1-dichloro-2-(2,4,5-trichlorophenyl)ethylene
1,1-dichloro-2-(2,4,6-trichlorophenyl)ethylene
1,1-dichloro-2-(2-nitrophenyl)ethylene
1,1-dichloro-2-(2,4-dinitrophenyl)ethylene
1,1-dichloro-2-(2-chloro-4-nitrophenyl)ethylene
1,1-dichloro-2-(2-nitro-4-chlorophenyl)ethylene 1,1-dichloro-2-(2-bromophenyl)ethylene
1,1-dichloro-2-(2,4-dibromophenyl)ethylene
1,1-dichloro-2-(3,4-dibromophenyl)ethylene
1,1-dichloro-2-(2-chloro-4-bromophenyl)ethylene
1,1-dichloro-2-(2,6-dichloro-4-bromophenyl)ethylene
1,1-dibromo-2-(4-nitrophenyl)ethylene
1,1-dibromo-2-(2,4-dinitrophenyl)ethylene
1,1-dibromo-2-(4-chlorophenyl)ethylene
1,1-dibromo-2-(3,4-dichlorophenyl)ethylene
1,1-dibromo-2-(2-chloro-4-nitrophenyl)ethylene
1,1-dibromo-2-(2,6-dichloro-4-bromophenyl)ethylene
1-chloro-1-bromo-2-(3,4-dichlorophenyl)ethylene
1-chloro-1-bromo-2-(4-nitrophenyl)ethylene
1-chloro-1-bromo-2-(2,4-dinitrophenyl)ethylene
1-chloro-1-bromo-2-(2-chloro-4-nitrophenyl)ethylene
1-chloro-1-fluoro-2-(2-nitrophenyl)ethylene
1-bromo-1-fluoro-2-(2-nitrophenyl)ethylene and the like.

As aforementioned the 1,1-dihaloethylenes are effective in destroying parasitic worm life, especially nematodes in infested soils, particularly agricultural soils. For example 1,1-dichloro-2-(4-nitrophenyl)ethylene and 1,1-dichloro-2-(3,4-dichlorophenyl)ethylene respectively at a concentration of 3 parts per million in aqueous suspension exhibited complete destruction of the vinegar eel worm (both larvae and adults), *Turbatrix aceti*. The soil-phase of nematode parasites such as the nematode *Meloidogyne javanica*, is also effectively controlled by incorporating in soil infested with same the 1,1-dihaloethylenes of this invention, and a particularly useful class of nematocidal 1,1-dihaloethylenes for this purpose are those of the formula

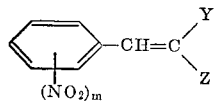

wherein $m$ is a whole number from 1 to 2 and wherein Y and Z are halogens of atomic weight in the range of 35 to 80 (i.e. chlorine or bromine).

In actual usage any of the 1,1-dihaloethylenes of this invention or mixtures thereof can be added to the soil in solution, as an emulsion or water dispersion but preferably is added in a solid formulation wherein the active nematocide is distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stable and other infested areas destroys eggs and infestive larvae of many parasites which infest animals. Moreover, the compositions are effective for the control of nematodes in their environment which includes bodies of animals.

In the use of 1,1-dihaloethylenes of this invention as nematocides or soil fumigants the active compound, diluted or undiluted, can be applied to the soil at rates of 5 to 100 pounds per acre. The preferred application for treating soils of average nematode infestation will be from 25 to 100 pounds per acre. The formulation preferably contains dispersants which aid uniform distribution.

While this invention has been described with respect to certain embodiments, it is to be understood that it is not so limited and that variations and modifications thereof obvious to those skilled in the art can be made without departing from the spirit and scope thereof.

What is claimed is:

1. The method of destroying nematode parasites which comprises contacting the nematode parasite with a 1,1-dihaloethylene of the formula

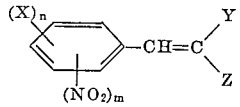

where Z is halogen of atomic weight in the range of 18 to 80, wherein Y is halogen of atomic weight in the range of 35 to 80, wherein X is halogen of atomic weight in the range of 35 to 80, wherein $n$ is an integer from 0 to 3, wherein $m$ is an integer from 0 to 2, and wherein the sum of $m$ and $n$ is an integer from 0 to 3.

2. The method of destroying the soil phase of nematode parasites which comprises incorporating in the nematode infested soil a 1,1-dihaloethylene of the formula

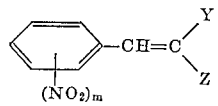

wherein Y and Z are halogens of atomic weight in the range of 35 to 80 and wherein $m$ is a whole number from 1 to 2.

3. The method of destroying the soil phase of nematode parasites which comprises incorporating in the nematode infested soil 1,1-dichloro-2-(4-nitrophenyl) ethylene.

4. The method of destroying the soil phase of nematode parasites which comprises incorporating in the nematode infested soil 1,1-dichloro-2-(3,4-dichlorophenyl) ethylene.

5. The method of destroying the soil phase of nematode parasites in an infested agricultural soil which comprises incorporating in the soil at a rate of 5 to 100 pounds per acre a 1,1-dihalo-ethylene of the formula

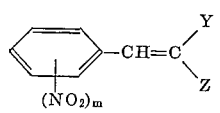

wherein $m$ is a whole number from 1 to 2 and wherein Y and Z are halogens of atomic weight in the range of 35 to 80.

References Cited by the Examiner
UNITED STATES PATENTS 2,312,801  3/1943  Craig et al. _____ 167—30
2,714,619  8/1955  Anderegg et al. _____ 167—22

JULIAN S. LEVITT, *Primary Examiner.*